(12) United States Patent
Olsen

(10) Patent No.: US 10,738,933 B2
(45) Date of Patent: Aug. 11, 2020

(54) LOCKING MEANS FOR TRANSPORT PROTECTION OF LEVELLING APPARATUS WITH INTEGRATED LOAD CELL

(71) Applicant: NGI A/S, Nørresundby (DK)

(72) Inventor: Tomas Hecht Olsen, Klarup (DK)

(73) Assignee: NGI A/S, Nørresundby (DK)

(*) Notice: Subject to any disclaimer, the term of this patent is extended or adjusted under 35 U.S.C. 154(b) by 0 days.

(21) Appl. No.: 16/349,382

(22) PCT Filed: Nov. 13, 2017

(86) PCT No.: PCT/DK2017/050374
§ 371 (c)(1),
(2) Date: May 13, 2019

(87) PCT Pub. No.: WO2018/091052
PCT Pub. Date: May 24, 2018

(65) Prior Publication Data
US 2019/0331287 A1  Oct. 31, 2019

(30) Foreign Application Priority Data
Nov. 18, 2016  (DK) ................................ 2016 70915

(51) Int. Cl.
*F16M 11/20* (2006.01)
*F16M 7/00* (2006.01)

(52) U.S. Cl.
CPC .......... *F16M 7/00* (2013.01); *F16M 2200/08* (2013.01)

(58) Field of Classification Search
CPC ........ F16M 7/00; F16B 11/006; A47B 91/024
See application file for complete search history.

(56) References Cited

U.S. PATENT DOCUMENTS 5,010,621 A * 4/1991 Bock .................... A47B 91/066
16/39
5,881,533 A   3/1999 Focke et al.
(Continued)

FOREIGN PATENT DOCUMENTS

DK   177 805 B1   7/2014
EP   0 670 480 A1   9/1995
(Continued)

OTHER PUBLICATIONS

Extended European Search Report dated Jun. 22, 2020 in corresponding European Application No. 17872694.9.

*Primary Examiner* — Amy J. Sterling
(74) *Attorney, Agent, or Firm* — Birch, Stewart, Kolasch & Birch, LLP.

(57) ABSTRACT

A levelling apparatus with an integrated load cell, said levelling apparatus being of the type comprising a spindle for fastening into an apparatus such as a machine, said spindle being connected to a lower part that is adapted for contact with a basis such as a floor, said lower part comprising a housing, in which a load cell with an activation surface is located, and further comprising a load transmitting means that extends through the upper side of the lower part and constitutes the connection between the lower part and the spindle, said load transmitting means comprising a lower end surface that is adapted to come into contact with the activation surface of the load cell, and an upper end surface that is adapted to come into fixed contact with the lower end surface of the spindle, the apparatus comprising a locking means for transport protection, which locking means comprises a nut that partially encloses the lower end of the spindle and is screwed onto an external thread on the lower end and thereby interposed between the lower end and the upper side of the lower part, the nut being capable of exerting a pressure on the lower part while still engaged with (Continued)

the external thread on the lower end, so that a portion of the lower part may be pressed against a lower end portion of the load transmitting means.

5 Claims, 3 Drawing Sheets

(56) References Cited

U.S. PATENT DOCUMENTS

| | | | | |
|---|---|---|---|---|
| 8,141,841 | B2* | 3/2012 | von Lillienskjold | ... F16F 1/445 248/188.8 |
| 9,826,835 | B1* | 11/2017 | Carpinella | ............. A47B 91/16 |
| 2010/0237205 | A1* | 9/2010 | Hirsh | ..................... A47B 91/16 248/188.4 |
| 2015/0338015 | A1 | 11/2015 | Lillienskjold | |

FOREIGN PATENT DOCUMENTS

| | | |
|---|---|---|
| GB | 2 281 693 A1 | 3/1995 |
| WO | WO 82/03109 | 9/1982 |
| WO | WO 2015/197065 A1 | 12/2015 |

\* cited by examiner

A-A

B-B

LOCKING MEANS FOR TRANSPORT PROTECTION OF LEVELLING APPARATUS WITH INTEGRATED LOAD CELL

The invention relates to a locking means for transport protection of a levelling apparatus with an integrated load cell, said levelling apparatus being of the type comprising a spindle for fastening into an apparatus such as a machine, said spindle being connected to a lower part that is adapted for contact with a basis such as a floor, said lower part comprising a housing, in which a load cell with an activation surface is located, and further comprising a load transmitting means that extends through the upper side of the lower part and constitutes the connection between the lower part and the spindle, said load transmitting means comprising a lower end surface that is adapted to come into contact with the activation surface of the load cell, and an upper end surface that is adapted to come into fixed contact with the lower end surface of the spindle.

A levelling apparatus of the above type with integrated load cell is known from the PCT patent application with the international publication No. WO2015/197065 A1, where said application for instance describes a design of such a levelling apparatus comprising a spindle that is connected to a lower part constituting a housing, in which a load cell with an upwards facing activation surface and also a load transmitting means that extends through the upper side of the lower part constitute the connection between the lower part and the spindle.

However, this known levelling apparatus has the drawback that the load cell as well as the adjustment thereof can easily be disrupted as a result of shocks and bumps that will often occur during transportation.

As a result thereof, the object of this invention is to provide a transport lock that can be used for instance for this type of levelling apparatuses.

The object of the invention is achieved by means of a locking means of the type devised in claim 1 and being characterized in further comprising a nut that encloses the lower end of the spindle and is screwed onto an external thread on this part and is thereby interposed between this lower part and the upper side of the lower part.

In this way, it is possible to protect a levelling apparatus with integrated load cell for transportation by screwing the nut out in relation to the spindle by means of a suited tool, so that the nut is pushed towards the upper side of the lower part, so as to obtain that the downwards facing end surface of the screw is pulled away from, and consequently out of contact with, the upwards facing activation surface of the load cell, and at the same time the parts of the levelling apparatus, the spindle and the lower part, are locked together until the transport lock is deactivated.

As stated in claim 2, the fixed connection between the load transmitting means and the lower end surface of the spindle is a threaded connection locked with threadlocker. This gives the advantage that the adjustment of the load cell is not disrupted when using the transport lock.

The invention will be explained in further detail referring to the drawings in which:

FIG. 1 shows a levelling apparatus with integrated load cell,

FIG. 2 shows the same levelling apparatus with integrated load cell, seen from a slightly different angle, FIG. 3 shows the same levelling apparatus, seen straight from the side, FIG. 4 shows the levelling apparatus in a sectional view along the plane A-A in FIG. 3, FIG. 5 shows the deactivated locking means, seen as an enlarged detail shown with the circle C in FIG. 4, FIG. 6 shows the levelling apparatus seen straight from the top, FIG. 7 shows the levelling apparatus in a sectional view along the plane B-B in FIG. 6, and FIG. 8 shows the activated locking means, seen as an enlarged detail shown with the circle D in FIG. 7.

FIGS. 1 and 2 show a levelling apparatus of the type consisting of an upper part that comprises a spindle 1 with a thread on the upper end thereof and intended for screwing into a supported apparatus such as a machine or a machine part, and, furthermore, said thread is partly enclosed in a combined thread shield 13 and locking nut for shielding of the part of the thread that is not screwed into the supported apparatus and for locking of the spindle towards said apparatus, along with a cylinder shaped, smooth lower part 1 (2 in FIG. 5) that is in two pieces that are screwed together and are each provided with juxtaposed surfaces (11 and 12) of limited extension for contact with tools such as spanners for separate manipulation of the end of the spindle.

This spindle is via a load transmitting means 3 which for instance, as in the example shown, can be designed as a screw 3 with a screw head which on the lower side is designed so that it fits with the lower surface 8a of the lower part 4, said lower part 4 being intended for contact with the underlying basis, such as a floor, and is therefore provided with two through bores 14 for reception of through screws for possible fastening of the lower part 4 to this underlying basis. In the embodiment shown here, the lower part is designed with a hollow that is an exact fit to receive a load cell 5 with an upwards facing activation surface (FIG. 5, 5) that is adapted to form a contact surface 9 against the downwards facing convex end surface of the load transmitting means 3, also known as the screw 3.

Figure 1:
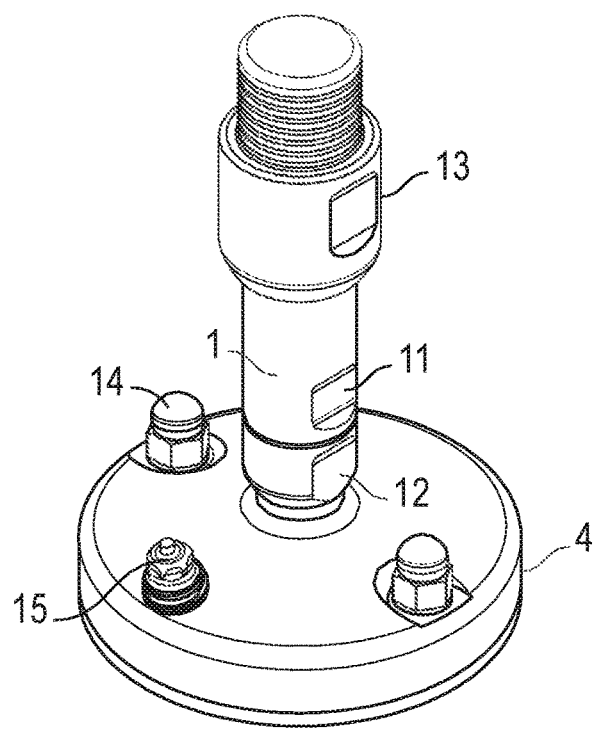
Figure 2:
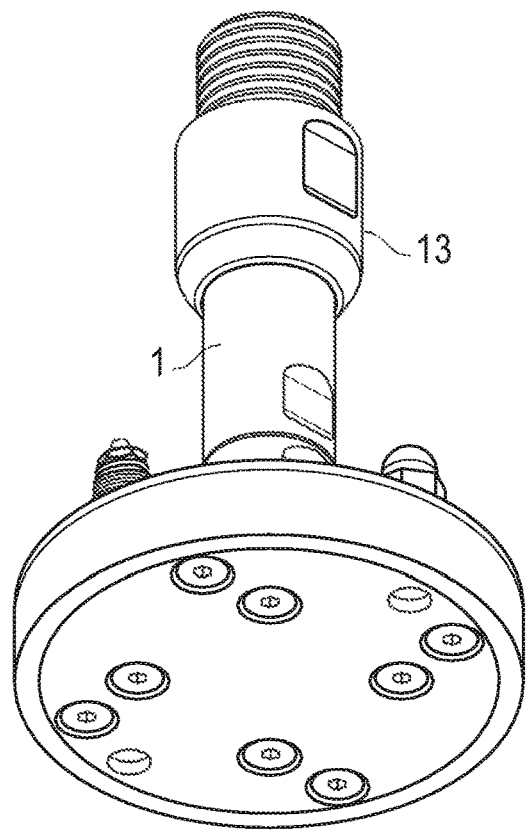
Figure 3:
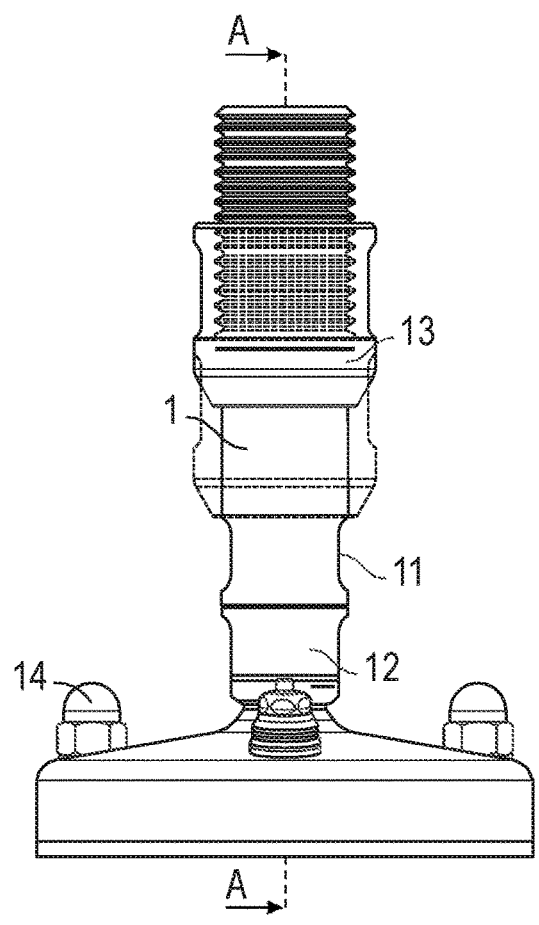
Figure 4:
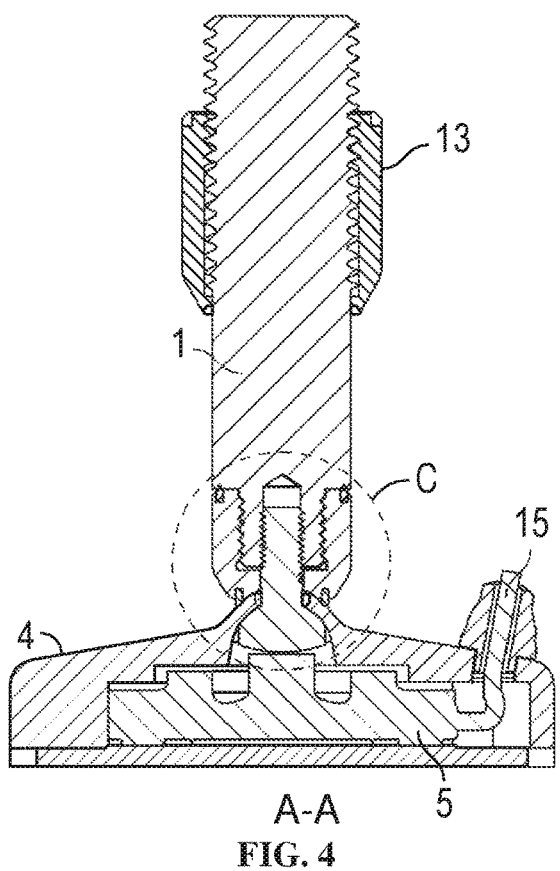
Figure 5:
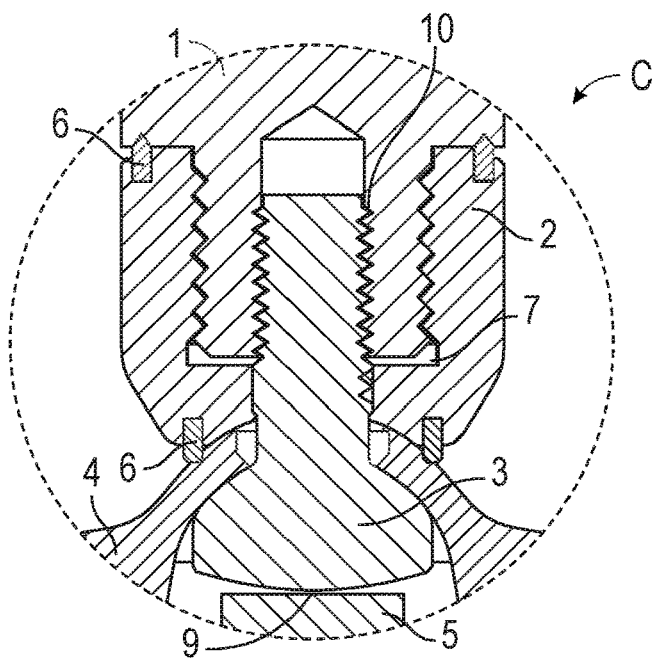
FIG. 5 shows an enlarged section of the circle of FIG. 4. This section shows the locking apparatus for transport protection of the levelling apparatus with the transportation lock deactivated, so that the apparatus is in weighing mode.
Figure 6:
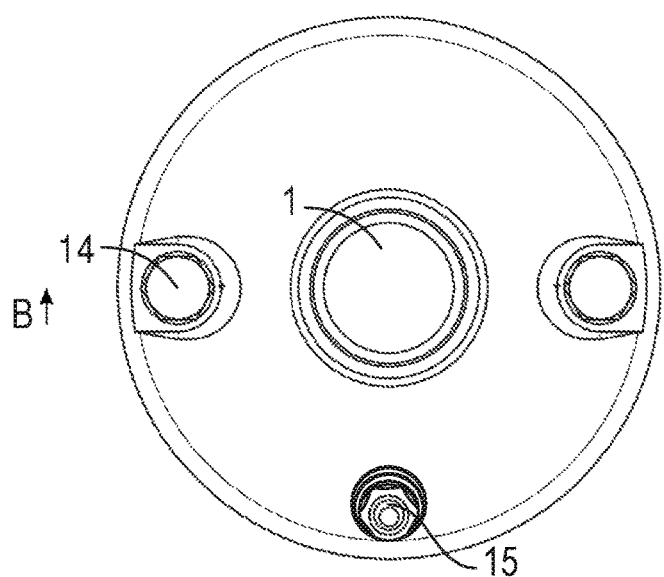
Figure 7:
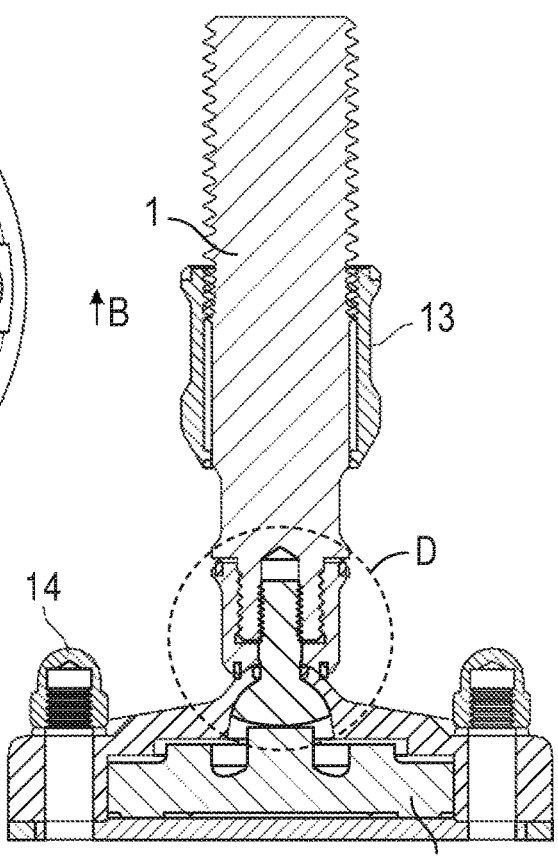
Figure 8:
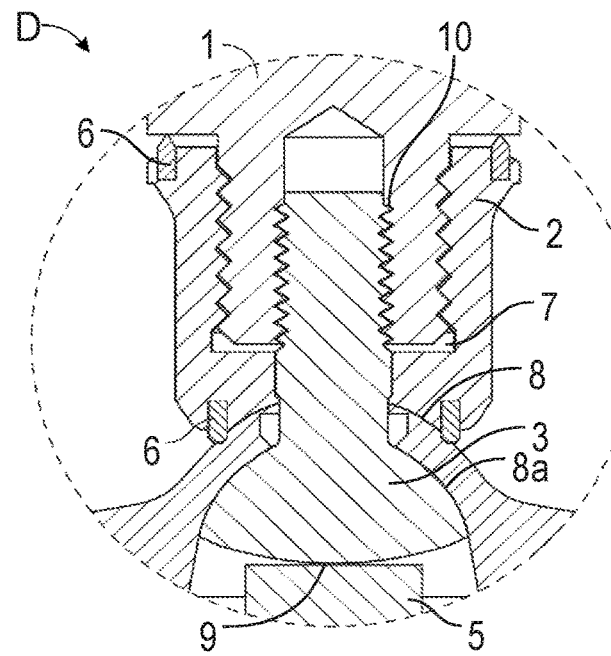
FIG. 8 shows an enlarged section of the circle D in FIG. 7. This section shows the locking apparatus for transport protection with the transportation lock activated so that the apparatus is in transportation mode.

As can be seen, for instance from FIGS. 5 and 7, the spindle 1 is at its lower end reduced to a diameter that is smaller than the diameter of the rest of the spindle 1. This reduction is provided with an external thread, on which a nut 2 is mounted, and, furthermore, the reduced part of the spindle 1 comprises a centre bore in which an internal thread 10 for receiving the threaded part of the screw 3 is located.

To assemble the spindle 1 and the lower part 4, the screw 3 is screwed up from the internal side of the lower part 4 through the upper side thereof through a bore that has a larger diameter compared to the diameter of the screw 3, but a smaller diameter than the head of said screw 3, and further through a centre bore in the nut 2 and therefrom into the centre bore in the reduced part of the spindle, where the distance with which the screw is inserted is adjusted so that there is contact 9 between the load cell 5 and the upwards facing activation surface (FIG. 5, 5) and the downwards facing end surface of the screw 3 (the convex head of the screw), and subsequently the screw is fastened to the thread (10) with threadlocker, such as Loctite®.

The nut 2 is provided with primarily static O-ring sealings 6, which, however, also must be able to resist limited dynamic movements both towards the spindle side 1 and towards the lower part side 4 to secure optimum sealing between these machine parts and in such a way that intrusion of grime and bacteria is avoided, and also in such a way that the surfaces at these connections are relatively easy to keep clean.

Activation of the transportation lock from weighing mode happens when the nut 2 is unscrewed in relation to the spindle 1 by means of a suited tool, so that the nut is pushed towards the upper side 8 of the lower part 4 and the screw head is pushed towards the inner side of the upper part 8a of the lower part 4, whereby the downward facing convex end surface of the screw 3 is pulled away from the upward facing activation surface 9 of the load cell 5, and, simultaneously, the parts of the levelling apparatus, spindle 1 and lower part 4, are locked together until the transportation lock is deactivated.

Deactivation takes place when the nut is screwed back in relation to the spindle 1.

The locking means for transport protection of a levelling apparatus with integrated load cell is explained on the basis of a levelling apparatus of the type described in DK Patent No. 177 805 B1, but it is, in principle, possible to use it as transport lock in many other connections with similar assemblies.

The invention claimed is:

1. Locking means for transport protection of a levelling apparatus with an integrated load cell, said levelling apparatus being of the type comprising a spindle for fastening into an apparatus such as a machine, said spindle being connected to a lower part that is adapted for contact with a basis such as a floor, said lower part comprising a housing, in which a load cell with an activation surface is located, and further comprising a load transmitting means that extends through the upper side of the lower part and constitutes the connection between the lower part and the spindle, said load transmitting means comprising a lower end surface that is adapted to come into contact with the activation surface of the load cell, and an upper end surface that is adapted to come into fixed contact with the lower end surface of the spindle, said locking means being wherein it comprises a nut that encloses the lower end of the spindle and is screwed onto an external thread on the lower end of the spindle and thereby interposed between the lower end part of the spindle and the upper side of the lower part.

2. Locking means for transport protection of a levelling apparatus according to claim 1, wherein the fixed connection between the load transmitting means and the lower end surface of the spindle is a threaded connection locked with threadlocker.

3. Locking means for transport protection of a levelling apparatus according to claim 1, wherein the nut is provided with O-ring sealings against both the lower part of the spindle and the surface of the lower part.

4. Locking means for transport protection of a levelling apparatus according to claim 2, wherein the nut is provided with O-ring sealings against both the lower part of the spindle and the surface of the lower part.

5. Locking means for a levelling apparatus with an integrated load cell, said levelling apparatus being of the type comprising a spindle for fastening into an apparatus such as a machine, said spindle being connected to a lower part that is adapted for contact with a basis such as a floor, said lower part comprising a housing, in which a load cell with an activation surface is located, and further comprising a load transmitting means that extends through the upper side of the lower part and constitutes the connection between the lower part and the spindle, said load transmitting means comprising a lower end surface that is adapted to come into contact with the activation surface of the load cell, and an upper end surface that is adapted to come into fixed contact with the lower end surface of the spindle, said locking means being wherein it comprises a nut that encloses the lower end of the spindle and is screwed onto an external thread on the lower end of the spindle and thereby interposed between the lower end part of the spindle and the upper side of the lower part.

\* \* \* \* \*